(12) United States Patent
Qian

(10) Patent No.: US 11,024,332 B2
(45) Date of Patent: Jun. 1, 2021

(54) CLOUD-BASED SPEECH PROCESSING METHOD AND APPARATUS

(71) Applicant: BAIDU ONLINE NETWORK TECHNOLOGY (BEIJING) CO., LTD., Beijing (CN)

(72) Inventor: Sheng Qian, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 67 days.

(21) Appl. No.: 16/154,365

(22) Filed: Oct. 8, 2018

(65) Prior Publication Data
US 2019/0139566 A1 May 9, 2019

(30) Foreign Application Priority Data
Nov. 6, 2017 (CN) .......................... 201711079226.5

(51) Int. Cl.
| | |
|---|---|
| *G10L 25/87* | (2013.01) |
| *G10L 15/30* | (2013.01) |
| *G10L 15/22* | (2006.01) |
| *G10L 15/28* | (2013.01) |
| *G10L 25/78* | (2013.01) |

(52) U.S. Cl.
CPC .............. *G10L 25/87* (2013.01); *G10L 15/22* (2013.01); *G10L 15/28* (2013.01); *G10L 15/30* (2013.01); *G10L 25/78* (2013.01); *G10L 2015/225* (2013.01)

(58) Field of Classification Search
CPC ...... G10L 15/05; G10L 15/1815; G10L 15/30
See application file for complete search history.

(56) References Cited

U.S. PATENT DOCUMENTS

| | | | |
|---|---|---|---|
| 9,437,186 B1* | 9/2016 | Liu .......................... | G10L 15/05 |
| 9,824,692 B1* | 11/2017 | Khoury ................. | G10L 17/18 |
| 9,876,901 B1* | 1/2018 | Bazzica ................ | H04M 3/323 |
| 2004/0030544 A1* | 2/2004 | Ramabadran ........... | G10L 25/78 |
| | | | 704/205 |

(Continued)

FOREIGN PATENT DOCUMENTS

| | | |
|---|---|---|
| CN | 1110821 A | 10/1995 |
| CN | 1412742 A | 4/2003 |

(Continued)

OTHER PUBLICATIONS

Chinese Patent Application No. 201711079226.5, First Office Action dated May 29, 2020, 9 pages.

(Continued)

*Primary Examiner* — Anne L Thomas-Homescu
(74) *Attorney, Agent, or Firm* — Lathrop GPM LLP

(57) ABSTRACT

The present disclosure proposes a speech processing method and a cloud-based speech processing apparatus. The speech processing method includes: acquiring a piece of speech to be recognized collected by a terminal; performing a speech recognition on the piece of speech to be recognized; detecting whether the piece of speech to be recognized ends during the speech recognition; and feeding back a recognized result of the piece of speech to be recognized to the terminal when it is detected that the piece of speech to be recognized ends.

7 Claims, 4 Drawing Sheets

(56) References Cited

U.S. PATENT DOCUMENTS

| | | | | |
|---|---|---|---|---|
| 2007/0265851 | A1* | 11/2007 | Ben-David | G10L 15/30 704/270.1 |
| 2007/0274297 | A1* | 11/2007 | Cross, Jr. | G10L 15/30 370/356 |
| 2009/0222263 | A1* | 9/2009 | Collotta | G10L 25/78 704/233 |
| 2013/0132089 | A1* | 5/2013 | Fanty | G10L 15/30 704/270 |
| 2014/0036022 | A1* | 2/2014 | Croen | H04N 7/147 348/14.01 |
| 2014/0163978 | A1* | 6/2014 | Basye | G10L 15/28 704/233 |
| 2016/0351196 | A1* | 12/2016 | Fanty | G10L 15/1815 |
| 2016/0379632 | A1* | 12/2016 | Hoffmeister | G10L 25/87 704/253 |
| 2017/0256258 | A1* | 9/2017 | Froelich | G10L 15/063 |
| 2017/0330555 | A1* | 11/2017 | Kawano | G06F 3/017 |
| 2018/0174582 | A1* | 6/2018 | Fanty | G10L 15/183 |
| 2018/0240466 | A1* | 8/2018 | Hofer | G10L 15/28 |
| 2019/0172444 | A1* | 6/2019 | Hiroe | G10L 15/00 |
| 2019/0287533 | A1* | 9/2019 | Homma | G10L 15/30 |
| 2019/0295534 | A1* | 9/2019 | Wan | G10L 15/04 |

FOREIGN PATENT DOCUMENTS

| | | |
|---|---|---|
| CN | 102158664 A | 8/2011 |
| CN | 103035243 A | 4/2013 |
| CN | 103354575 A | 10/2013 |
| CN | 103839549 A | 6/2014 |
| CN | 103971685 A | 8/2014 |
| CN | 104485105 A | 4/2015 |
| CN | 105845129 A | 8/2016 |
| CN | 105933181 A | 9/2016 |
| CN | 106504756 A | 3/2017 |
| CN | 106531167 A | 3/2017 |
| CN | 106792048 A | 5/2017 |
| CN | 106937266 A | 7/2017 |
| CN | 107146618 A | 9/2017 |

OTHER PUBLICATIONS

Chinese Patent Application No. 201711079226.5, English translation of First Office Action dated May 29, 2020, 11 pages.

Chinese Patent Application No. 201711079226.5, Second Office Action dated Jan. 29, 2021, 9 pages.

Chinese Patent Application No. 201711079226.5, English translation of Second Office Action dated Jan. 29, 2021, 14 pages.

* cited by examiner

CLOUD-BASED SPEECH PROCESSING METHOD AND APPARATUS

CROSS-REFERENCE TO RELATED APPLICATION

The present application is based upon and claims priority to Chinese Patent Application No. 201711079226.5, filed on Nov. 6, 2017, the entire contents of which are incorporated herein by reference.

FIELD

The present disclosure relates to a field of speech processing technology, and more particularly to a cloud-based speech processing method and a cloud-based speech processing apparatus.

BACKGROUND

With a continuous development of terminal devices, in order to simplify user's operations, after the user inputs a piece of speech in a terminal, the terminal may recognize the speech and convert the speech into corresponding text, such that the user may perform subsequent operations such as surfing the Internet, shopping and the like according to the converted text. In the prior art, the terminal may locally recognize the speech by using a Voice Activity Detection (VAD) model. Specifically, the time domain energy signal of the audio may be used to determine a start point and an end point of the speech.

In this way, the local VAD model in the terminal may only use a simple model structure due to the limitation of the local memory, storage space and computing power of the terminal, resulting in poor noise anti-interference performance, which causes the recognition accuracy low. Moreover, since the VAD model is implemented locally in the terminal, when migrating to different hardware platforms, a redevelopment is required, resulting in higher cost.

SUMMARY

Embodiments of the present disclosure seek to solve at least one of the problems existing in the related art to at least some extent.

Accordingly, a first objective of the present disclosure is to provide a cloud-based speech processing method.

A second objective of the present disclosure is to provide a cloud-based speech processing apparatus.

A third objective of the present disclosure is to provide a non-transitory computer-readable storage medium.

In order to achieve the above objectives, embodiments of the present disclosure provide a cloud-based speech processing method. The cloud-based speech processing method may include: acquiring a piece of speech to be recognized collected by a terminal; performing a speech recognition on the piece of speech to be recognized; detecting whether the piece of speech to be recognized ends during the speech recognition; and feeding back a recognized result of the piece of speech to be recognized to the terminal when it is detected that the piece of speech to be recognized ends.

In order to achieve the above objectives, embodiments of the present disclosure provide a cloud-based speech processing apparatus. The apparatus may include: one or more processors; a memory storing instructions executable by the one or more processors; in which the one or more processors are configured to: acquire a piece of speech to be recognized collected by a terminal; perform a speech recognition on the piece of speech to be recognized; detect whether the piece of speech to be recognized ends during the speech recognition; and feed back a recognized result of the piece of speech to be recognized to the terminal when it is detected that the piece of speech to be recognized ends.

In order to achieve the above objectives, embodiments of the present disclosure provide a non-transitory computer-readable storage medium having a computer program stored thereon, wherein when the computer program is executed by a processor, the processor is caused to perform the cloud-based speech processing method according to embodiments of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the accompanying drawings, in which.

DETAILED DESCRIPTION

Figure 1:
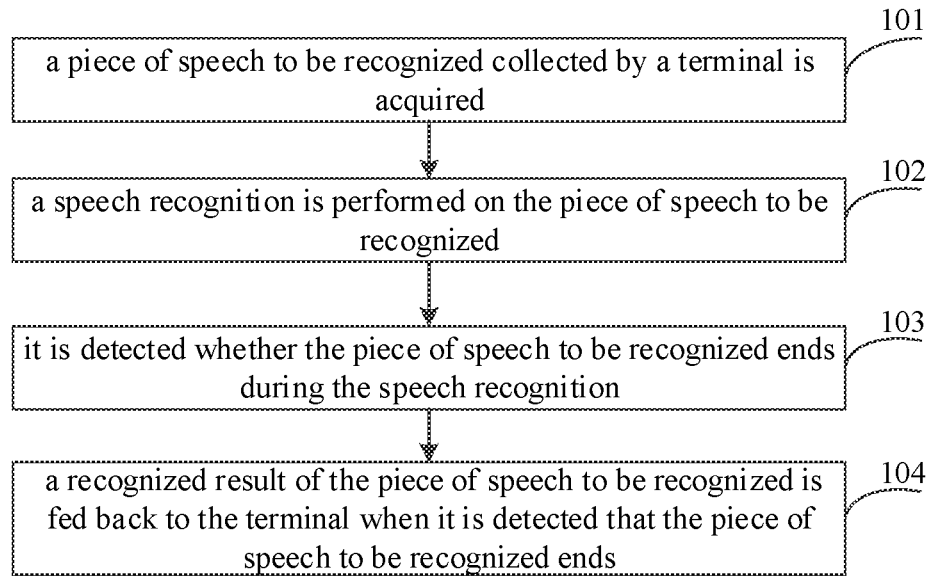
FIG. 1 is a flow chart of a first cloud-based speech processing method according to an embodiment of the present disclosure.

Reference will be made in detail to embodiments of the present disclosure, where the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

A speech processing method and a cloud-based speech processing apparatus according to embodiments of the present disclosure will be described with reference to drawings.

FIG. 1 is a flow chart of a first cloud-based speech processing method according to an embodiment of the present disclosure.

An executive subject of the present disclosure is the cloud. The recognition processing is performed on the speech via the cloud.

As illustrated in FIG. 1, the method may include the following.

At block 101, a piece of speech to be recognized collected by a terminal is acquired.

In embodiments of the present disclosure, the speech to be recognized is a piece of speech needs to be recognized via the cloud. The terminal may provide the collected speech to be recognized to the cloud, and the terminal is, for example, a personal computer (PC), a cloud device or a mobile device, and the mobile device includes, for example, a smart phone, or a tablet computer and the like.

Specifically, a trigger condition for inputting the speech may be set on the terminal. For example, the trigger condition may be a speech input button, and the user inputs the speech to be recognized by using the speech input button, and the terminal may collect the speech to be recognized. The collected speech to be recognized is then sent to the cloud, such that the cloud may acquire the speech to be recognized.

It should be noted that, during the process of the user inputting the speech to be recognized, the terminal may collect the speech to be recognized inputted by the user and send the collected speech to be recognized to the cloud at the same time, such that the cloud may acquire the speech to be recognized inputted by the user at the same time when the user inputs the speech to be recognized, and the instantaneity of the speech recognition may be ensured.

At block 102, a speech recognition is performed on the piece of speech to be recognized.

Alternatively, when the cloud receives the speech to be recognized, the speech to be recognized may be recognized using mature speech recognition technology in prior art to acquire a recognized result, which will not be limited herein.

At block 103, it is detected whether the piece of speech to be recognized ends during the speech recognition.

When the piece of speech to be recognized ends, it may be indicated that the user stops talking or has finished speaking or inputted a complete sentence. It can be understood that, a start point and an endpoint of the speech are needed to be detected during the speech recognition, in which the endpoint detection is the core that determines how long the user waits after inputting the speech. After the endpoint of the speech is detected, the user can obtain the recognized result, such that subsequent operations may be triggered according to the recognized result. During the process of detecting the endpoint, if the determining time of the endpoint is too long, the user needs to wait for a long time to obtain the recognized result. Alternatively, if the endpoint of the speech is misjudged, a situation that the current speech ends when the user has not finished speaking yet may be happened, which will greatly affect the user experience.

Therefore, in embodiments of the present disclosure, during the speech recognition, when the cloud does not obtain the recognized text within a preset time duration, or the last recognized character does not change within the preset time duration, it may be determined that the speech to be recognized reaches the endpoint. When the speech to be recognized reaches the endpoint, it can be determined whether the speech to be recognized is over. Therefore, in this embodiment, in the process of the speech recognition, the endpoint of the to-be-recognized speech may be detected by Voice Activity Detection (VAD) technology, and it is determined whether the speech to be recognized ends.

Further, when the endpoint of the speech to be recognized is detected, in order to ensure the accuracy of the recognized result, a semantic analysis may also be performed on the recognized result, and semantic integrity of the recognized result may be acquired. When the semantic integrity of the recognized result is satisfied, i.e., when a semanteme of the recognized result is integrated, or when the user inputs a complete sentence, it may be determined that the speech to be recognized ends. Therefore, in this embodiment, during the speech recognition, it may be determined whether the speech to be recognized ends using the VAD technology and the semantic integrity of the recognized result.

Alternatively, during the speech recognition, in order to ensure an instantaneity of the speech recognition, it may be determined whether the speech to be recognized ends according to the semantic integrity of the recognized result directly, which is not limited in embodiments of the present disclosure.

At block 104, a recognized result of the piece of speech to be recognized is fed back to the terminal when it is detected that the piece of speech to be recognized ends.

In embodiments of the present disclosure, when the cloud detects that the speech to be recognized ends, in order to ensure that the user acquiring the speech recognition in time, the recognized result of the speech to be recognized may be fed back to the terminal, such that the user may proceed on the subsequent processing.

With the cloud-based speech processing method according to embodiments of the present disclosure, a piece of speech to be recognized collected by a terminal is acquired, a speech recognition is performed on the piece of speech to be recognized, it is detected whether the piece of speech to be recognized ends during the speech recognition, and a recognized result of the piece of speech to be recognized is fed back to the terminal when it is detected that the piece of speech to be recognized ends. In this embodiment, by detecting whether the piece of speech to be recognized ends during the speech recognition, an accuracy of the speech recognition may be ensured. Further, the speech recognition performed on cloud is independent from the local terminal and thus from the hardware platform, and there is no migration development and no limitation of the local resources of the terminal. Therefore, the speech recognition model used on cloud may be made in a complicated and sophisticated way, thereby ensuring the accuracy of the speech recognition. Moreover, the speech recognition model used on cloud has been customized for different applications, such that the need to retrain the model is eliminated and the development capacity is simplified.

As a possible implementation, in order to improve the instantaneity of the speech recognition, Voice Activity Detection (VAD) technology may be used to detect the endpoint of the speech to be recognized, so as to determine whether the speech to be recognized ends. The above process will be described in detail as follows with reference to FIG. 2.

Figure 2:
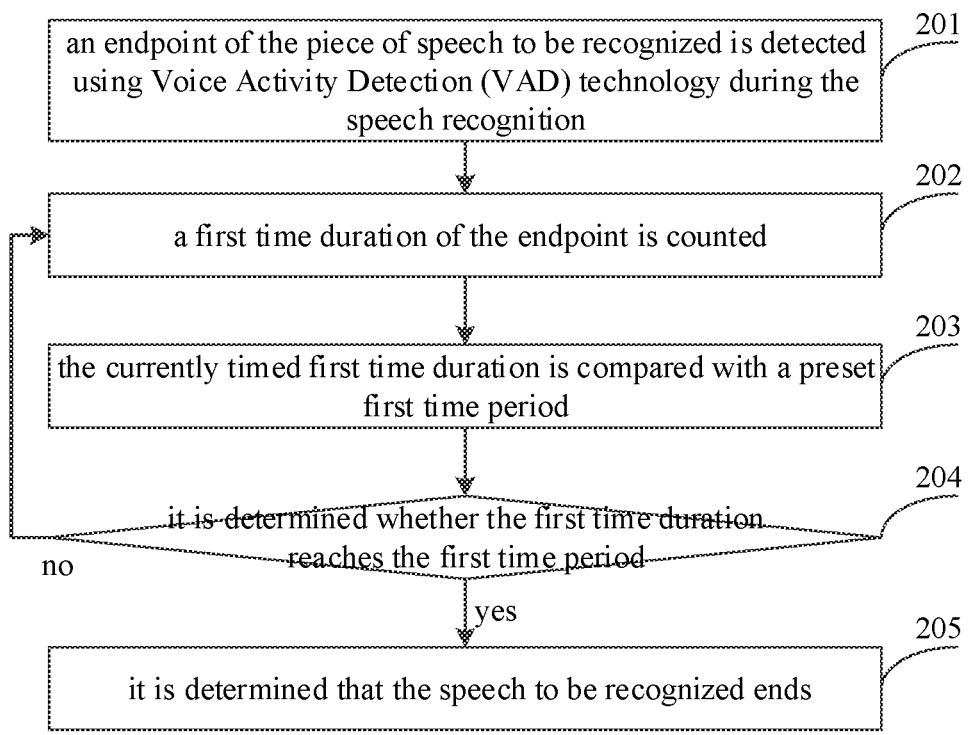
FIG. 2 is a flow chart of a second cloud-based speech processing method according to an embodiment of the present disclosure.

FIG. 2 is a flow chart of a second cloud-based speech processing method according to an embodiment of the present disclosure.

As illustrated in FIG. 2, the act in block 103 includes the following sub-steps.

At block 201, an endpoint of the piece of speech to be recognized is detected using Voice Activity Detection (VAD) technology during the speech recognition.

In embodiments of the present disclosure, during the speech recognition, the endpoint of the speech to be recognized is detected using the VAD technology. Specifically, when the cloud does not obtain the recognized text within the preset time duration, or the last recognized character does not change within the preset time duration, it may be determined that the speech to be recognized reaches the tail.

At block 202, a first time duration of the endpoint is counted.

In embodiments of the present disclosure, a timer may be set to count the first time duration of the endpoint. For example, the first time duration of the endpoint may be labeled as T1.

At block 203, the currently counted first time duration is compared with a preset first time period.

In this embodiment, after the endpoint is detected, the cloud may wait for a time period to determine whether the user keeps talking. It should be understood that, if the cloud waits for a long time, the user may obtain the recognized result after a long time waiting, which will affect the user's experience. Therefore, in embodiments of the present disclosure, the first time period should not be set to be too long. For example, the first time duration may be 1 s. Alternatively, the first time period may be labeled as T11.

Alternatively, the currently counted first time duration T1 is compared with the preset first time period T11, so as to acquire a result that T1 is greater than or equal to T11 or that T1 is smaller than T11.

At block 204, it is determined whether the first time duration reaches the first time period, if yes, act in block 205 is performed; otherwise, act in block 202 is performed.

Alternatively, when it is determined that the first time duration T1 reaches the first time period T11, in other words, when T1 is greater than or equal to T11, it is indicated that the user does not talk within the first time period T11. At this time, in order to avoid the user waiting for a long time to obtain the recognized result, the cloud may determine that the speech to be recognized ends, so as to improve the instantaneity of the speech recognition. When the first time duration T1 of the endpoint does not reach the first time period T11, the first time duration T1 of the endpoint is counted continuously, and it is determined that the speech to be recognized ends until the first time period T11 is reached.

At block 205, it is determined that the speech to be recognized ends.

With the cloud-based speech processing method, by detecting the endpoint of the speech to be recognized using the VAD technology and determining whether the speech to be recognized ends, the instantaneity of the speech recognition may be improved effectively.

As another possible implementation, in order to improve the accuracy of the speech recognition, it is determined whether the speech to be recognized ends using the VAD technology and the semantic integrity of the recognized result. The above process will be described in detail as follows with reference to FIG. 3.

Figure 3:
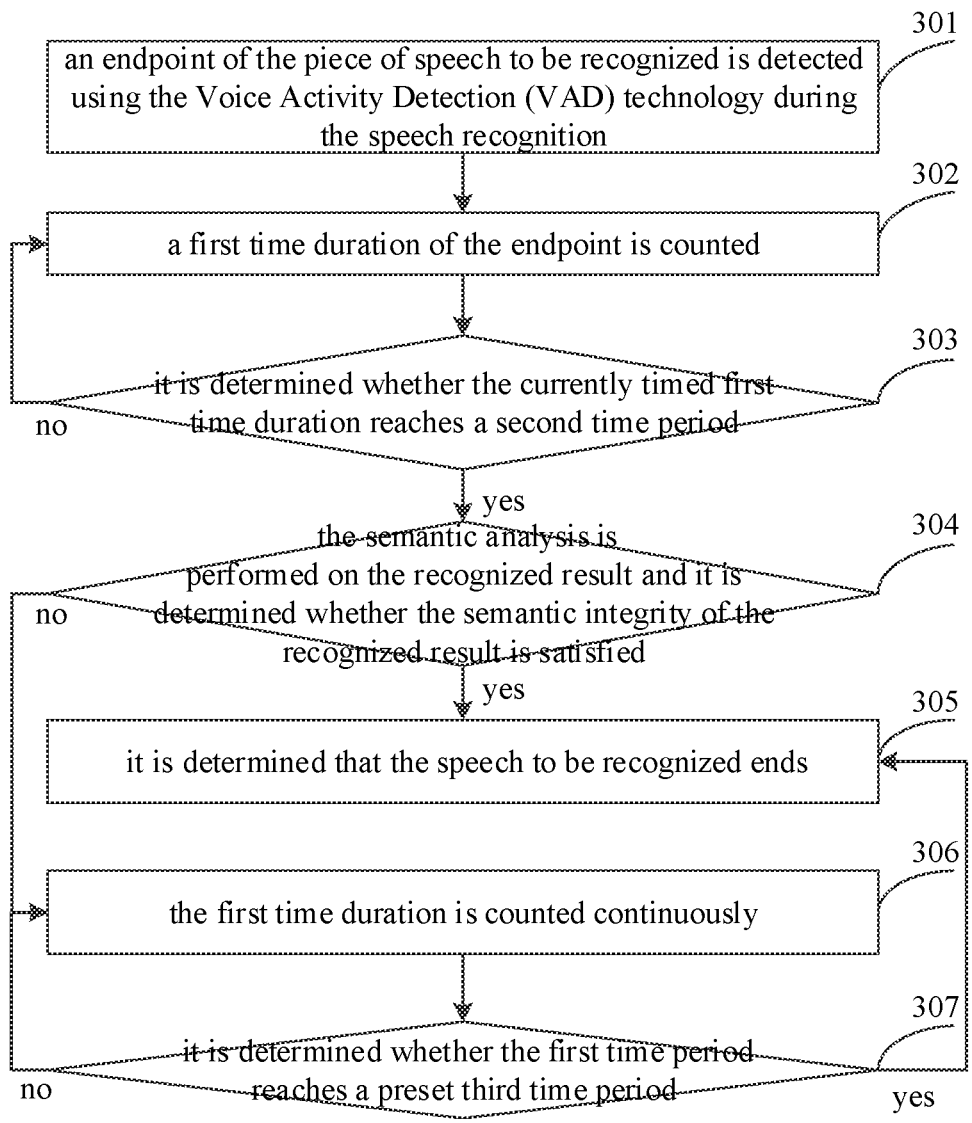
FIG. 3 is a flow chart of a third cloud-based speech processing method according to an embodiment of the present disclosure.

FIG. 3 is a flow chart of a third cloud-based speech processing method according to an embodiment of the present disclosure.

As illustrated in FIG. 3, the act in block 103 may include the following sub-steps.

At block 301, an endpoint of the piece of speech to be recognized is detected using the Voice Activity Detection (VAD) technology during the speech recognition.

At block 302, a first time duration of the endpoint is counted.

The executing processes of acts in blocks 301-302 refer to that of acts in blocks 201-202, which will not be described in detail herein.

At block 303, it is determined whether the currently counted first time duration reaches a second time period, if yes, act in block 304 is performed; otherwise, act in block 302 is performed.

In embodiments of the present disclosure, the second time period is smaller than the first time period T11 and is labeled as T12. For example, the second time period T12 may be 0.5 s.

In this embodiment, the cloud may perform a semantic analysis on the recognized result at a specified time when the time duration of the endpoint in this embodiment reaches the second time period, such that the accuracy of the speech recognition may be improved. Therefore, it should be firstly determined that whether the currently counted first time duration T1 reaches the preset second time period T12. If T1 reaches T12, act in block 304 is triggered; if T1 does not reaches T12, the first time duration T1 of the endpoint is counted continuously, i.e., act in block 302 is triggered.

At block 304, the semantic analysis is performed on the recognized result and it is determined whether the semantic integrity of the recognized result is satisfied, if yes, act in block 305 is performed; otherwise, act in block 306 is performed.

In this embodiment, in order to ensure the accuracy of the recognized result, when the first time duration T1 reaches the second time period T12, the cloud may determine whether the speech to be recognized ends by determining whether the semantic integrity of the recognized result is satisfied, i.e., by determining whether the sememe of the recognized result is integrated. Specifically, when the currently counted first time duration T1 reaches the second time period T12, the semantic analysis is performed on the recognized result. For example, the semantic analysis may be performed on the recognized result using the prior art, such that it may be determined whether the sememe of the recognized result is integrated. When the sememe of the recognized result is integrated, it may be determined that the speech to be recognized ends. However, when the sememe of the recognized result is not integrated, act in block 306 is triggered.

At block 305, it is determined that the speech to be recognized ends.

At block 306, the first time duration is counted continuously.

At block 307, it is determined whether the first time period reaches a preset third time period, is yes, act in block 305 is performed; otherwise, act in block 306 is performed.

In embodiments of the present disclosure, the third time period is greater than the first time period and labeled as T13. For example, the third period T13 may be 1.5 s.

Alternatively, when it is determined that the sememe of the recognized result is not integrated, the preset time period T11 is adjusted and the first time period T11 is changed to the present third time period T13. It is determined whether the speech to be recognized ends by determining whether the first time duration T1 reaches the preset third time period T13. Specifically, when the first time duration T1 reaches the preset third time period T13, it may be determined that the speech to be recognized ends. However, when the first time duration T1 does not reaches the preset third time period T13, the first time duration T1 is counted continuously, and it is determined that the speech to be recognized ends until the first time duration T1 reaches the preset time period T13.

For example, if the recognized result is "今天天气怎 (how the weather today)", after the semantic analysis, it is determined that the sememe of the recognized result is not integrated, even if the preset first time period is reached, it should keep waiting for a while. If no new content is detected, it is indicated that the endpoint of the speech is reached, and the recognized result can be outputted and fed back to the terminal.

With the cloud-based speech processing method according to embodiments of the present disclosure, by detecting whether the speech to be recognized ends using the VAD technology and the semantic integrity of the recognized result, the accuracy of the speech recognition may be improved effectively.

As yet another possible implementation, in order to ensure the instantaneity of the speech recognition, it may be determined whether the speech to be recognized ends using semantic integrity of the recognized result. The above process will be described in detail as follows with reference to FIG. 4.

Figure 4:
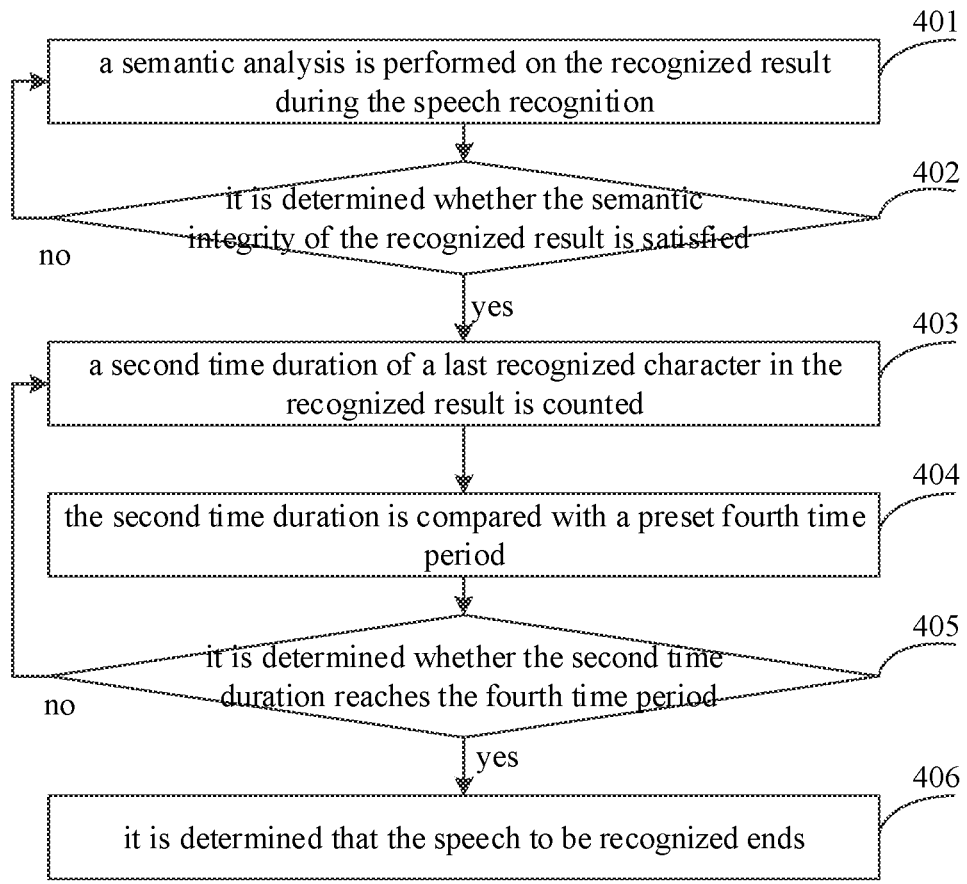
FIG. 4 is a flow chart of a fourth cloud-based speech processing method according to an embodiment of the present disclosure.

FIG. 4 is a flow chart of a fourth cloud-based speech processing method according to an embodiment of the present disclosure.

As illustrated in FIG. 4, act in block 103 may include the following.

At block 401, a semantic analysis is performed on the recognized result during the speech recognition.

Alternatively, the semantic analysis may be performed on the recognized result using the prior art to obtain a semantic analyzed result of the recognized result, which will not be limited in embodiments of the present disclosure.

At block 402, it is determined whether the semantic integrity of the recognized result is satisfied, if yes, act in block 403 is performed; otherwise, act in block 401 is performed.

Alternatively, when the semantic integrity of the recognized result is satisfied, i.e., when the sememe of the recognized result is integrated, it is merely determined that the user finishes a complete sentence, instead of indicating that the speech to be recognized ends. At this time, act in block 403 may be triggered. However, when the sememe of the recognized result is not integrated, it is indicated that the speech to be recognized does not end, and the semantic analysis may be performed on the recognized result continuously, i.e., act in block 401 is triggered.

At block 403, a second time duration of a last recognized character in the recognized result is counted.

In embodiments of the present disclosure, a timer may be set to count the second time duration of the last recognized character in the recognized result. For example, the second time duration of may be labeled as T2.

In this embodiment, when it is determined that the sememe of the recognized result is integrated, it is merely determined that the user finishes a complete sentence, instead of indicating that the speech to be recognized ends. Therefore, the second time duration T2 of the last recognized character in the recognized result is further determined, such that it may be determined whether the speech to be recognized ends.

At block 404, the second time duration is compared with a preset fourth time period.

In embodiments of the present disclosure, when determining the last recognized character in the recognized result, the cloud may wait for a while and determine whether the user keeps talking. If the cloud waits for a long time, the user may acquire the recognized result after a long time waiting, which may affect the user's experience dramatically. Therefore, in embodiments of the present disclosure, the fourth time period should not be set to be too long. Alternatively, the fourth time period may be smaller than the first time period T11. The fourth time period may be labeled as T14. For example, the fourth time period T14 may be 0.5 s.

At block 405, it is determined whether the second time duration reaches the fourth time period, if yes, act in block 406 is performed; otherwise, act in block 403 is performed.

Alternatively, when the second time duration T2 does not reach the fourth time period T14, the second time duration of a last recognized character in the recognized result is counted continuously, i.e., act in block 403 is triggered. When the second time duration T2 reaches the fourth time period T14, it may be determined that the speech to be recognized ends.

At block 406, it is determined that the speech to be recognized ends.

With the cloud-based speech processing method according to embodiments of the present disclosure, by detecting whether the speech to be recognized ends using the semantic integrity of the recognized result, the instantaneity of the speech recognition may be improved effectively.

In embodiments of the present disclosure, when it is detected that the speech to be recognized ends, an ending instruction is sent to the terminal, such that the terminal is caused to perform a target operation matched to the ending instruction, in which the ending instruction is configured to indicate that the piece of speech to be recognized ends. When the terminal receives the ending instruction, the speech inputting operation of the user may be finished, such that the user may acquire the recognized result and perform the subsequent operations according to the recognized result.

In order to implement the above embodiments, the present disclosure also provides a cloud-based speech processing apparatus.

Figure 5:
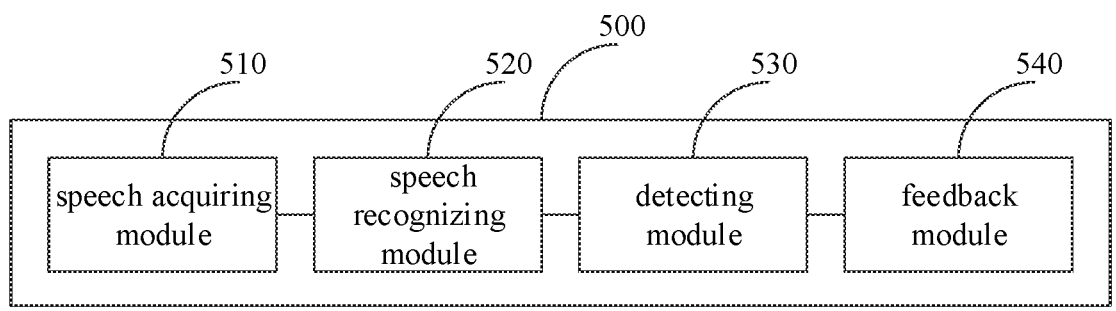
FIG. 5 is a block diagram of a cloud-based speech processing apparatus according to an embodiment of the present disclosure.

FIG. 5 is a block diagram of a cloud-based speech processing apparatus according to an embodiment of the present disclosure.

As illustrated in FIG. 5, the speech cloud-based processing apparatus 500 may include: a speech acquiring module 510, a speech recognizing module 520, a detecting module 530 and a feedback module 540.

The speech acquiring module 510 is configured to acquire a piece of speech to be recognized collected by a terminal.

The speech recognizing module 520 is configured to perform a speech recognition on the piece of speech to be recognized.

The detecting module 530 is configured to detect whether the piece of speech to be recognized ends during the speech recognition.

In embodiments of the present disclosure, the detecting module 530 is specifically configured to determine whether the piece of speech to be recognized ends using Voice Activity Detection technology and/or semantic integrity of the recognized result during the speech recognition.

As a possible implementation of embodiments of the present disclosure, the detecting module 530 is specifically configured to detect an endpoint of the piece of speech to be recognized using the Voice Activity Detection technology during the speech recognition, to count a first time duration of the endpoint, to compare the first time duration with a preset first time period, and to determine that the piece of speech to be recognized ends when the first time duration reaches the preset first time period.

As another possible implementation of embodiments of the present disclosure, the detecting module 530 is specifically configured to detect an endpoint of the piece of speech to be recognized using the Voice Activity Detection technology during the speech recognition, to count a first time duration of the endpoint, to perform a semantic analysis on the recognized result when the currently counted first time duration reaches the preset second time period and to determine whether semantic integrity of the recognized result is satisfied, i.e., to determine whether a semanteme of the recognized result is integrated, to determine that the speech to be recognized ends when the semanteme of the recognized result is integrated, to count the first time duration continuously when the semanteme of the recognized result is not integrated, and to determine that the speech to be recognized ends when the first time duration reaches a preset third time period.

As yet another possible implementation of embodiments of the present disclosure, the detecting module 530 is specifically configured to perform a semantic analysis on the recognized result to determine whether semantic integrity of the recognized result is satisfied, i.e., to determine whether a semanteme of the recognized result is integrated, to count a second time duration of a last recognized character in the recognized result when the semanteme of the recognized result is integrated, and to compare the second time duration with a preset fourth time period, to determine that the piece of speech to be recognized ends when the second time duration reaches the fourth time period.

The feedback module 540 is configured to feed back a recognized result of the piece of speech to be recognized to the terminal when it is detected that the piece of speech to be recognized ends.

Figure 6:
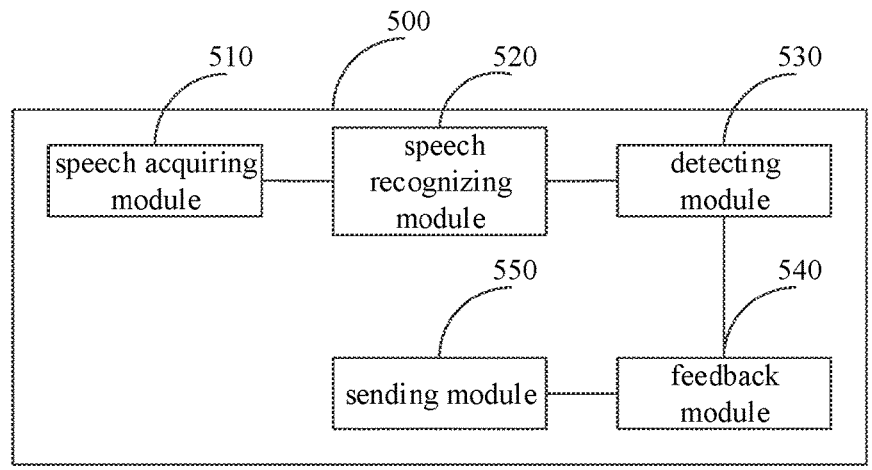
FIG. 6 is a block diagram of a cloud-based speech processing apparatus according to another embodiment of the present disclosure.

Further, in a possible implementation of embodiments of the present disclosure, referring to FIG. 6, based on the embodiment illustrated in FIG. 5, the speech processing apparatus 500 may also include a sending module 550.

The sending module 550 is configured to send an ending instruction to the terminal when it is detected that the piece of speech to be recognized ends, such that the terminal is caused to perform a target operation matched to the ending instruction, in which the ending instruction is configured to indicate that the piece of speech to be recognized ends.

It should be noted that, the description and explanation of the above embodiments of the cloud-based speech processing method may also be suitable for the embodiments of the cloud-based speech processing apparatus 500, which will not be described in detail herein.

With the cloud-based speech processing apparatus according to embodiments of the present disclosure, a piece of speech to be recognized collected by a terminal is acquired, a speech recognition is performed on the piece of speech to be recognized, it is detected whether the piece of speech to be recognized ends during the speech recognition, and a recognized result of the piece of speech to be recognized is fed back to the terminal when it is detected that the piece of speech to be recognized ends. In this embodiment, by detecting whether the piece of speech to be recognized ends during the speech recognition, an accuracy of the speech recognition may be ensured. Further, the speech recognition performed on cloud is independent from the local terminal and thus from the hardware platform, and there is no migration development and no limitation of the local resources of the terminal. Therefore, the speech recognition model used on cloud may be made in a complicated and sophisticated way, thereby improving an anti-interference performance of the system and the accuracy of the speech recognition. Moreover, the speech recognition model used on cloud has been customized for different applications, such that the need to retrain the model is eliminated and the development capacity is simplified.

In order to implement the above embodiments, the present disclosure further provides a computer device.

Figure 7:
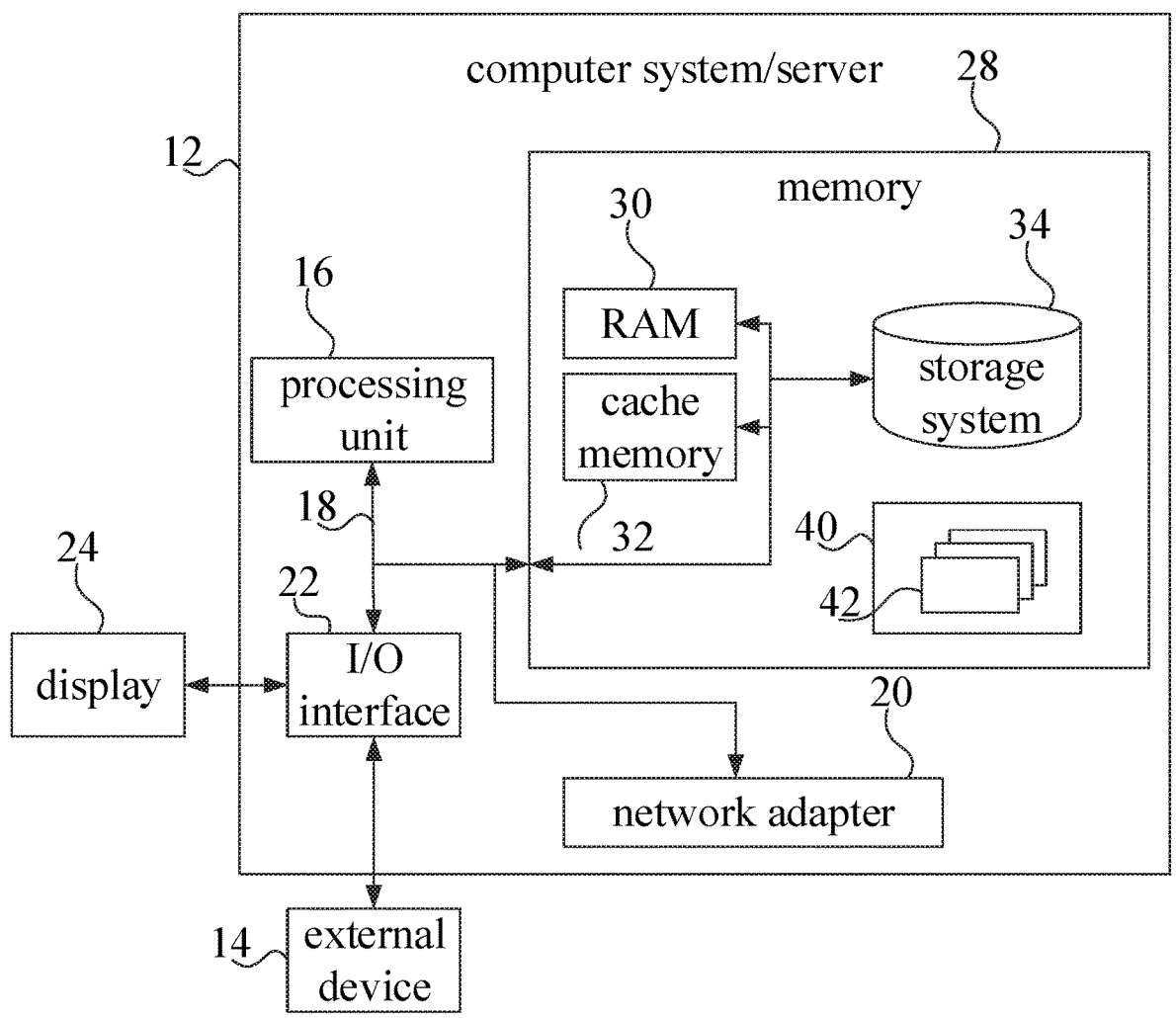
FIG. 7 is a block diagram of a computer device for implementing embodiments of the present disclosure.

FIG. 7 is a block diagram of a computer device for implementing embodiments of the present disclosure. The computer device 12 illustrated in FIG. 7 is merely an example, which should not be understood as a limitation of the functions and application range.

As illustrated in FIG. 7, the computer device 12 is embodied in the form of a general purpose computing device. The components of computer device 12 may include, but are not limited to, one or more processors or processing units 16, a system memory 28, a bus 18 configured to connect different system components including the system memory 28 and the processing unit 16.

The bus 18 represents one or more of several types of bus structures, including a memory bus or memory controller, a peripheral bus, a graphics acceleration port, a processor, or a local bus using any of a variety of bus structures. For example, these architectures include, but are not limited to, an Industry Standard Architecture (hereinafter referred to as ISA) bus, a Micro Channel Architecture (MAC) bus, an enhanced ISA bus, and video electronics. The Standards Association (Video Electronics Standards Association; hereinafter referred to as: VESA) local bus and Peripheral Component Interconnection (hereinafter referred to as PCI) bus.

Computer device 12 typically includes a variety of computer system readable media. These media can be any available media that can be accessed by the computer device 12, including both volatile and nonvolatile media, removable and non-removable media.

The system memory 28 may include a computer system readable media in the form of volatile memory, such as random access memory (RAM) 30 and/or cache memory 32. The computer device 12 may further include other removable/non-removable, volatile/non-volatile computer system storage media. For example, the storage system 34 may be used to read and write non-removable, non-volatile magnetic media (not shown in FIG. 7, commonly referred to as "hard disk drives"). Although not shown in FIG. 7, a disk drive for reading and writing to a removable non-volatile disk (such as a "floppy disk"), and a removable non-volatile disk (for example, Compact Disc Read Only Memory (CD-ROM), Digital Video Disc Read Only Memory (DVD-ROM) Or other optical media). In these cases, each drive can be coupled to the bus 18 via one or more data medium interfaces. The memory 28 may include at least one program product having a set (e.g., at least one) of program modules configured to perform the functions of the various embodiments of the present disclosure.

A program/utility 40 having a set (at least one) of program modules 42 may be stored, for example, in memory 28, such program modules 42 including, but not limited to, an operating system, one or more applications, other programs modules and program data, each of these examples or some combination may include an implementation of a network environment. The program module 42 typically performs the functions and/or methods of the embodiments described herein.

The computer device 12 may also be in communication with one or more external devices 14 (e.g., a keyboard, a pointing device, a display 24, etc.), and may also be in communication with one or more devices that enable a user to interact with the computer device 12, and/or any device (e.g., a network card, a modem, etc.) that enables the computer device 12 to communicate with one or more other computing devices. This communication may take place via an input/output (I/O) interface 22. Moreover, the computer device 12 may also communicate to one or more networks through a network adapter 20 (for example, a local area network (LAN), a wide area network (WAN), and/or a public network, such as the Internet). As shown in the figures, the network adapter 20 communicates with other modules of computer device 12 via the bus 18. It should be understood that, although not shown in the FIG. 7, other hardware and/or software modules may be utilized in conjunction with computer device 20, including but not limited to: a microcode, a device driver, a redundant processing unit, an external disk drive array, an RAID system, a tape drive and a data backup storage system, etc.

The processing unit 16 executes various function applications and data processing by executing programs stored in the system memory 28, for example, implementing the above-mentioned cloud-based speech processing method.

In order to implement the above embodiments, the present disclosure further provides a computer program product, in which when instructions in the computer program product are executed by a processor, the processor is caused to perform the cloud-based speech processing method according to the above-described embodiments.

In order to implement the above embodiments, the present disclosure further provides a non-transitory computer-readable storage medium having instructions stored thereon, in which when the instructions are executed by a processor, the processor is caused to perform the cloud-based speech processing method according to the above-described embodiments.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, in a case without contradictions, different embodiments or examples or features of different embodiments or examples may be combined by those skilled in the art.

Additionally, those skilled in the art shall understand that terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

The flow chart or any process or method described herein in other manners may represent a module, segment, or portion of code that comprises one or more executable instructions to implement the specified logic function(s) or that comprises one or more executable instructions of the steps of the progress. And the scope of a preferred embodiment of the present disclosure includes other implementations in which the order of execution may differ from that which is depicted in the flow chart, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that the various parts of the present disclosure may be realized by hardware, software, firmware or combinations thereof. In the above embodiments, a plurality of steps or methods may be stored in a memory and achieved by software or firmware executed by a suitable instruction executing system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable memory medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable memory medium.

The above-mentioned memory medium may be a read-only memory, a magnetic disc, an optical disc, etc. Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A cloud-based speech processing method, comprising:
   acquiring, by the cloud, a piece of speech to be recognized collected by a terminal;
   performing a speech recognition on the piece of speech to be recognized on the cloud;
   detecting, on the cloud, whether the piece of speech to be recognized ends using voice activity detection technology and semantic integrity of the recognized result during the speech recognition, comprising:
      determining that the piece of speech to be recognized reaches an endpoint when a last character recognized by the cloud does not change within a preset duration;
      counting a first time duration of the endpoint, performing a semantic analysis on a recognized result of the piece of speech to be recognized and determining whether the semantic integrity of the recognized result is satisfied when the first time duration reaches a preset second time period;
      counting a second time duration of a last recognized character in the recognized result when the semantic integrity of the recognized result is satisfied; and
      determining that the piece of speech to be recognized ends when the second time duration reaches a preset fourth time period, wherein the preset fourth time period is shorter than the preset first time period; and
   sending, by the cloud, an ending instruction to the terminal when it is detected that the piece of speech to be recognized ends, such that the terminal is caused to perform a target operation matched to the ending instruction, the ending instruction being configured to indicate that the piece of speech to be recognized ends and to inform the terminal to stop collecting speech; and
   feeding back, from the cloud, the recognized result of the piece of speech to be recognized to the terminal, such that the terminal is caused to perform operations corresponding to the recognized result.

2. The method according to claim 1, further comprising:
   counting the first time duration when the semantic integrity of the recognized result is not satisfied; and
   determining that the piece of speech to be recognized ends when the first time duration reaches a preset third time period.

3. The method according to claim 1, wherein when the semantic integrity of the recognized result is satisfied, it is determined that a user finishes a complete sentence, instead of indicating that the speech to be recognized ends.

4. A cloud-based speech processing apparatus, applied to a cloud, comprising:
   one or more processors;
   a memory storing instructions executable by the one or more processors;
   wherein the one or more processors are configured to:
   acquire a piece of speech to be recognized collected by a terminal;
   perform a speech recognition on the piece of speech to be recognized;
   detect whether the piece of speech to be recognized ends using voice activity detection technology and semantic integrity of the recognized result during the speech recognition by performing acts of:
      determining that the piece of speech to be recognized reaches an endpoint when a last character recognized by the cloud does not change within a preset duration;
      counting a first time duration of the endpoint, performing a semantic analysis on a recognized result of the piece of speech to be recognized and determining whether the semantic integrity of the recognized result is satisfied when the first time duration reaches a preset second time period;
      counting a second time duration of a last recognized character in the recognized result when the semantic integrity of the recognized result is satisfied; and
      determining that the piece of speech to be recognized ends when the second time duration reaches a preset fourth time period, wherein the preset fourth time period is shorter than the preset first time period; and
   feed back the recognized result of the piece of speech to be recognized to the terminal, such that the terminal is caused to perform operations corresponding to the recognized result.

5. The apparatus according to claim 4, wherein the one or more processors are further configured to:
   count the first time duration when the semantic integrity of the recognized result is not satisfied; and
   determine that the piece of speech to be recognized ends when the first time duration reaches a preset third time period.

6. The apparatus according to claim 4, wherein when the semantic integrity of the recognized result is satisfied, it is determined that a user finishes a complete sentence, instead of indicating that the speech to be recognized ends.

7. A non-transitory computer-readable storage medium having a computer program stored thereon, wherein when the computer program is executed by a processor, the processor is caused to perform a cloud-based speech processing method, the method comprising:
   acquiring, by the cloud, a piece of speech to be recognized collected by a terminal;
   performing a speech recognition on the piece of speech to be recognized on the cloud;
   detecting, on the cloud, whether the piece of speech to be recognized ends using voice activity detection technology and semantic integrity of the recognized result during the speech recognition, comprising:
      determining that the piece of speech to be recognized reaches an endpoint when a last character recognized by the cloud does not change within a preset duration;
      counting a first time duration of the endpoint, performing a semantic analysis on a recognized result of the piece of speech to be recognized and determining whether the semantic integrity of the recognized result is satisfied when the first time duration reaches a preset second time period;
      counting a second time duration of a last recognized character in the recognized result when the semantic integrity of the recognized result is satisfied; and
      determining that the piece of speech to be recognized ends when the second time duration reaches a preset fourth time period, wherein the preset fourth time period is shorter than the preset first time period; and
   sending, by the cloud, an ending instruction to the terminal when it is detected that the piece of speech to be recognized ends, such that the terminal is caused to perform a target operation matched to the ending instruction, the ending instruction being configured to indicate that the piece of speech to be recognized ends and to inform the terminal to stop collecting speech; and feeding back, from the cloud, the recognized result of the piece of speech to be recognized to the terminal, such that the terminal is caused to perform operations corresponding to the recognized result.

\* \* \* \* \*